C. L. GOODRUM.
SIGNAL TRANSMITTER TESTING DEVICE.
APPLICATION FILED JUNE 23, 1915.
1,196,855.
Patented Sept. 5, 1916.
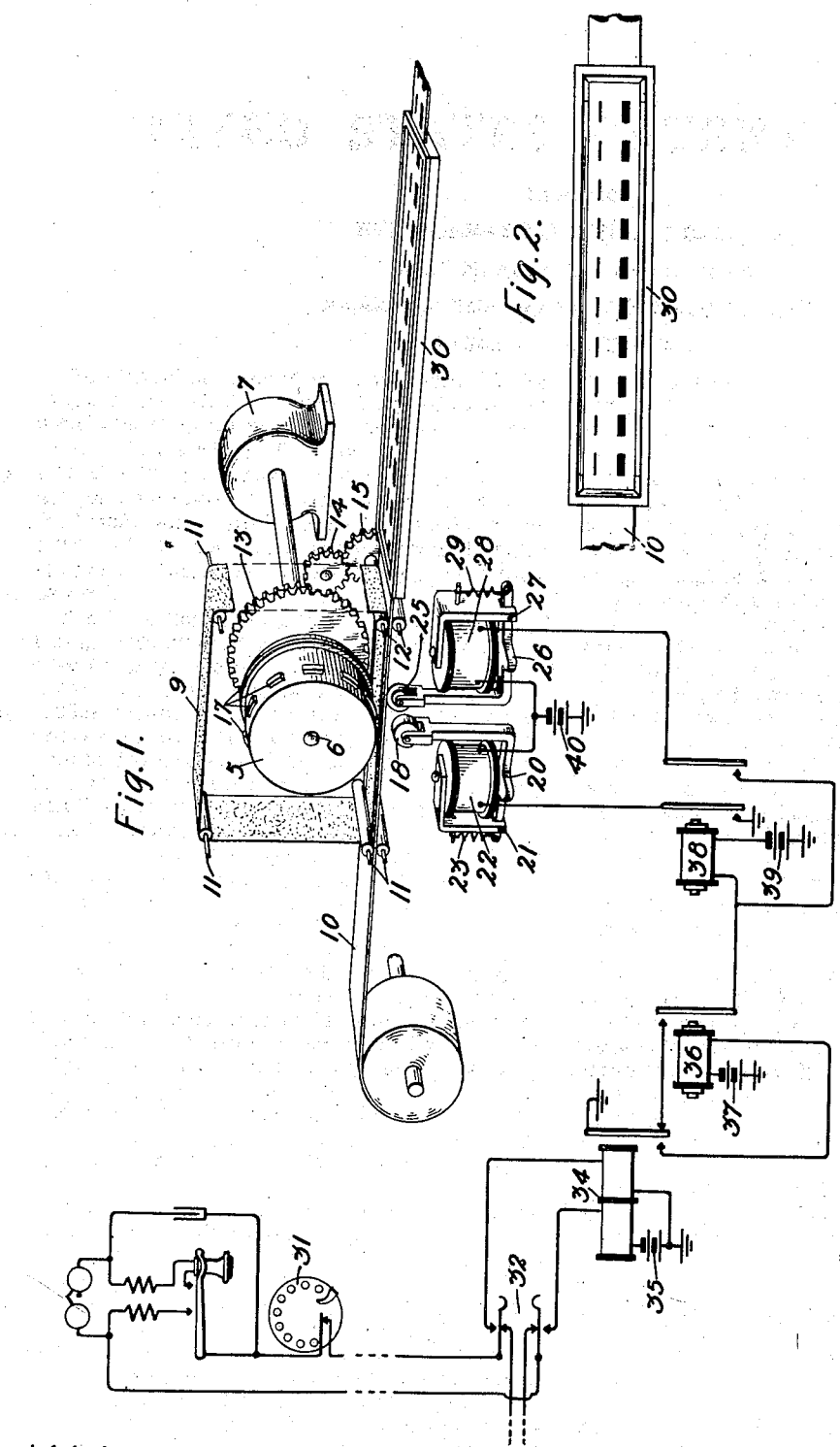
Witnesses:
O. M. Guthe
J. E. Rasmussen
Inventor:
Charles L. Goodrum.
by A. C. Hannel, Atty.

UNITED STATES PATENT OFFICE.

CHARLES L. GOODRUM, OF NEW YORK, N. Y., ASSIGNOR, BY MESNE ASSIGNMENTS, TO WESTERN ELECTRIC COMPANY, INCORPORATED, A CORPORATION OF NEW YORK.

SIGNAL-TRANSMITTER-TESTING DEVICE.

1,196,855.  Specification of Letters Patent.  Patented Sept. 5, 1916.

Application filed June 23, 1915. Serial No. 35,783.

*To all whom it may concern:*

Be it known that I, CHARLES LANE GOODRUM, a citizen of the United States, residing at New York, in the county of New York and State of New York, have invented certain new and useful Improvements in Signal-Transmitter-Testing Devices, of which the following is a full, clear, concise, and exact description.

This invention relates to the testing of signal transmitters used in connection with automatic telephone or other electric systems. Its general object is to provide a new and improved testing device which will furnish a graphic indication of the length and arrangement of current impulses produced by a signal transmitter, and will enable a comparison to be made between the current impulses from the signal transmitter to be tested and current impulses such as would be sent out by a properly adjusted or standard signal transmitter.

In the drawing, Figure 1 is a partly diagrammatic view of a testing device embodying my invention and the circuits and apparatus through which the signal transmitter to be tested is connected to said testing device; and Fig. 2 is a fragmentary plan view showing the window of the testing device through which the tape bearing the graphic indications is visible.

In the drawing, the testing device is shown as a printing mechanism which prints on a moving tape indications corresponding in length and arrangement with a standard set of current impulses and also prints indications representing a set of current impulses sent out by the signal transmitter to be tested. This printing mechanism comprises a printing drum 5 mounted on a shaft 6, driven by an electric or other suitable motor 7 which may be controlled in any suitable manner. A printing ribbon 9 and the tape 10 upon which the graphic indications are to be printed are guided into coöperative relation with the printing drum 5 by guide rollers 11 and feed rollers 12, one of the latter being driven from shaft 6 through gearing 13, 14 and 15. The drum 5 carries a plurality of lugs 17 with which an impression roller 18 coöperates. These lugs 17 are of such a shape and arrangement that the indications which they print on tape 10 correspond to standard current impulses from a properly adjusted signal transmitter. The impression roller 18 is shown supported in the end of an L-shaped armature 20 pivotally mounted at 21 in the frame of an electromagnet 22; and a spring 23 serves to retract the armature to the position shown. Located beneath the tape 10 and adjacent the roller 18 is another impression roller 25 which serves to force the tape 10 and printing ribbon 9 into engagement with the smooth cylindrical surface of the printing drum 5. While this impression roller 25 is in engagement with the tape, a graphic indication in the form of a line is printed on the top of said tape. The impression roller 25 is mounted in the end of an L-shaped armature 26 pivotally mounted at 27 on the frame of electromagnet 28; and a spring 29 serves to hold said armature in its retracted position as shown. It is the impression roller 25 which causes the printing of indications corresponding in length and arrangement to the current impulses produced by the signal transmitter to be tested. For convenience of observation, the tape 10 may pass beneath a window of glass mounted on a frame 30 as shown; and the right end of said frame 30 may form a cutting edge against which sections of tape may be torn off.

The testing device above described is shown in the drawing as wired, through certain intermediary apparatus, to a subscriber's station of an automatic telephone system. The apparatus at the subscriber's station is indicated by well-known conventional symbols among which is that which represents the signal transmitter 31, which when operated serves to produce current impulses by interruptions and completions of the circuit. The circuits and apparatus located between the subscriber's station and the testing device are similar to the arrangement shown, described and claimed in my copending application for patent Serial No. 14,971, filed March 17, 1915. The arrangement will be readily understood from the following description of the mode of operation of the testing device shown.

It is of course understood that the testing device may be located at any suitable place, preferably in the central office of an automatic telephone exchange, and that the signal transmitter to be tested may be connected to it in any suitable manner. As shown, the line wires leading to the substation apparatus, including the signal transmitter 31, lead to a key 32 which may be used to connect the testing apparatus to the circuit on which the signal transmitter to be tested is located. Assuming that the switch 32 is operated so as to connect the substation circuit to the testing apparatus, and assuming that the receiver at the substation has been removed from the switchhook, the line relay 34 will be energized through the following circuit: from grounded battery 35 through one winding of the relay 34, one set of contacts of the key 32, one of the line wires to the substation, the substation apparatus, the other line wire, the other contacts of key 32, and the other winding of the relay 34 to ground. The energization of the line relay 34 causes said relay to close a circuit for a slow-acting relay 36 as follows: from grounded battery 37, coil of relay 36, and front contacts of line relay 34 to ground. Until the signal transmitter 31 at the substation is actuated, no further change in the circuits and apparatus takes place. When the signal transmitter 31 is operated, the first impulse produced by the opening of the line circuit deënergizes the line relay 34 causing its armature to open its front contacts and close its back contacts. The closing of the back contacts of the relay 34 completes a circuit for a slow-acting relay 38 as follows: from grounded battery 39, coil of relay 38, contacts of slow-acting relay 36 (which have not opened), and back contacts of line relay 34 to ground. The energization of relay 38 closes both of its sets of contacts. The closing of the left-hand set of contacts of relay 38 completes a circuit for the electromagnet 22 controlling the printing of indications corresponding to standard impulses, from grounded battery 40, which circuit is maintained throughout the time that impulses are being sent from the signal transmitter, owing to the fact that the intervals of no current through the coils of slow-acting relays 36 and 38 are too short to allow the deënergization of said relays. The closing of the right-hand contacts of relay 38 completes a circuit for the electromagnet 28, which controls the printing of impulses sent by the signal transmitter to be tested, as follows: from grounded battery 40, through electromagnet 28, right-hand contacts of relay 38, contacts of relay 36, and back contacts of line relay 34 to ground. Electromagnets 22 and 28 are thus energized at the same time, thereby starting simultaneously the printing of the indications corresponding to standard impulses and the printing of indications corresponding to the impulses sent by the signal transmitter to be tested. When the signal transmitter again completes the line circuit at the end of the first impulse, the line relay 34 is reënergized, with the consequent opening of its back contacts and closing of its front contacts. This has no effect on the electromagnet 22 which is maintained energized as before explained, but the circuit for the electromagnet 28 is interrupted at the back contacts of the relay 34, and the impression roller 25 is moved out of contact with the tape. Upon the sending of the next current impulse by the signal transmitter, the electromagnet 28 is reënergized in the same manner as before, and another indication corresponding to that impulse is thereby printed on the tape. In this manner, the electromagnet 28 is repeatedly energized in unison with the current impulses sent by the signal transmitter, and the indications printed on the tape by the impression roller 25 controlled by said magnet correspond in number, length and arrangement with the impulses sent. After the last impulse has been sent and the line circuit has been completed for a sufficient interval of time, the energization of the relay 34 and the consequent opening of its back contacts, will open the circuit for the relay 38 and will cause the latter to open both of its sets of contacts which are located in the circuits of the electromagnets 22 and 28. The printing of indications corresponding to standard impulses is, therefore, stopped after the impulses have all been sent from the signal transmitter to be tested. The tape is then ready to be observed either through the window in the frame 30 or after the tape has been pulled out and torn off.

What is claimed is:

1. A signal transmitter testing device comprising a tape, means for moving the same, means for making indications on said tape corresponding in length and arrangement to standard current impulses from a signal transmitter, and means for making other indications on said tape parallel to and adjacent said first mentioned indications and corresponding in length and arrangement to the current impulses from the signal transmitter to be tested.

2. A signal transmitter testing device comprising a tape, means for moving the same, electromagnetically controlled printing means for printing indications on said tape corresponding in length and arrangement to standard current impulses from a signal transmitter, another electromagnetically controlled printing means for printing other indications on said tape corresponding in length and arrangement to the current impulses of the signal transmitter to be tested, and means for starting and stopping both of said electromagnetically operated printing means simultaneously.

In witness whereof, I hereunto subscribe my name this 21st day of June A. D., 1915.

CHARLES L. GOODRUM.